United States Patent [19]

Gerber

[11] 4,178,820
[45] Dec. 18, 1979

[54] METHOD AND APPARATUS FOR CUTTING SHEET MATERIAL WITH IMPROVED ACCURACY

[75] Inventor: Heinz J. Gerber, West Hartford, Conn.

[73] Assignee: Gerber Garment Technology,, South Windsor, Conn.

[21] Appl. No.: 907,330

[22] Filed: May 18, 1978

Related U.S. Application Data

[62] Division of Ser. No. 790,035, Apr. 22, 1977, Pat. No. 4,133,234.

[51] Int. Cl.² .......................... B26D 5/00; B26F 1/38
[52] U.S. Cl. .......................................... 83/13; 83/56; 83/71; 83/74; 83/747; 83/756; 83/925 CC
[58] Field of Search .................. 83/13, 56, 71, 72, 74, 83/747, 756, 758, 925 CC

[56] References Cited

U.S. PATENT DOCUMENTS

| | | | |
|---|---|---|---|
| 3,507,177 | 4/1970 | Baldwin | 83/174 |
| 3,541,906 | 11/1970 | Sederberg et al. | 83/174 X |
| 3,855,887 | 12/1974 | Pearl et al. | 83/925 CC |
| 3,864,997 | 2/1975 | Pearl et al. | 83/925 CC X |
| 4,033,214 | 7/1977 | Pearl | 83/174 |

Primary Examiner—Willie G. Abercrombie
Attorney, Agent, or Firm—McCormick, Paulding & Huber

[57] ABSTRACT

A method and apparatus for cutting pattern pieces from sheet material with an automatically controlled cutting machine utilizes special control techniques for guiding a reciprocating cutting blade accurately along a desired cutting path defined by the pattern piece peripheries. The cutting machine includes a control computer which also serves as a data processor for generating machine command signals and controlling cutting blade movements. The controller has memory units which contain standard cutting programs and optinal programs. From a program selector panel, the cutting machine operator can select optional programs which modify the standard programs in a manner most suitably adapted to cause the cutting blade to follow the cutting path in the sheet material more accurately. The optional programs vary the feed rate or stroking speed, introduce yaw signals to control blade orientation along the cutting path, or perform other control functions.

39 Claims, 18 Drawing Figures

U.S. Patent    Dec. 18, 1979    Sheet 1 of 8    4,178,820
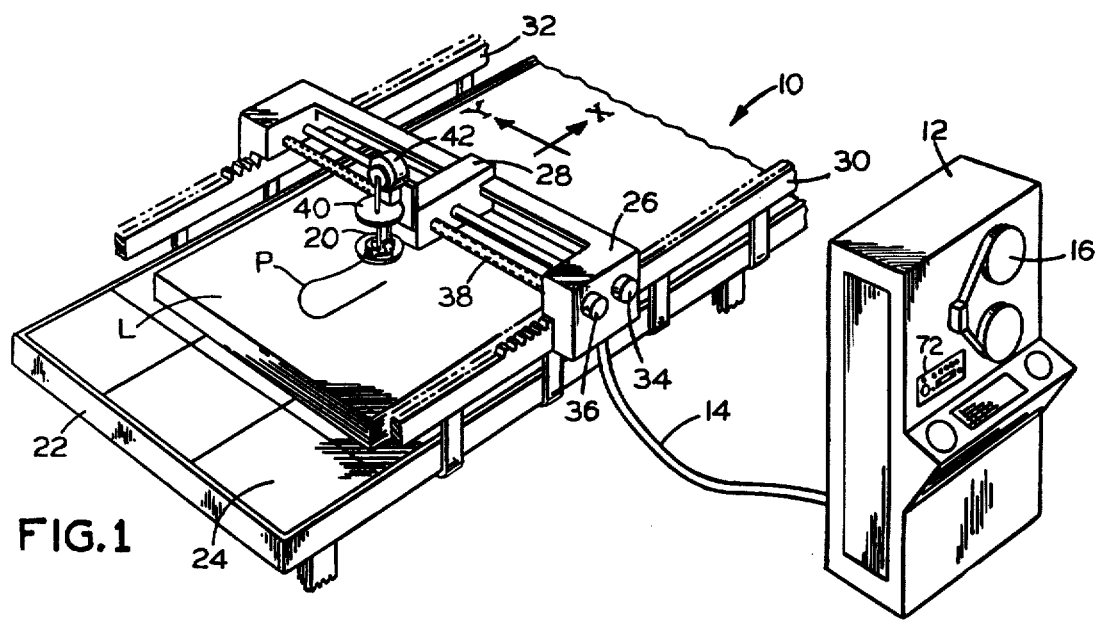
FIG. 1
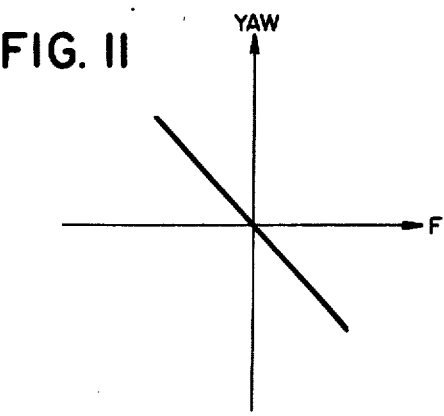
FIG. II FIG. 3
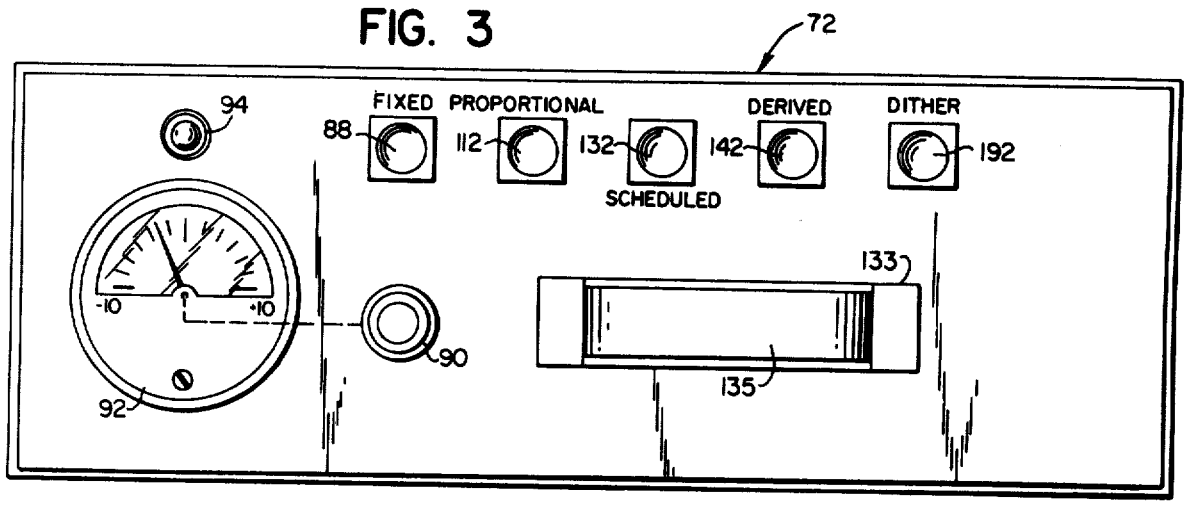
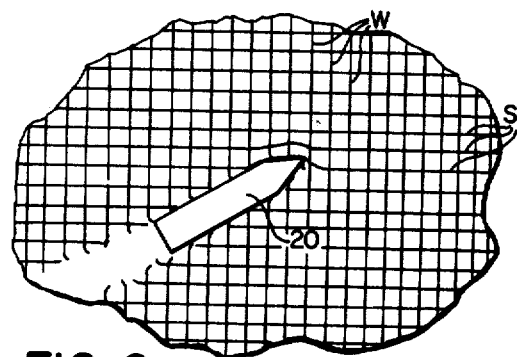
FIG. 6
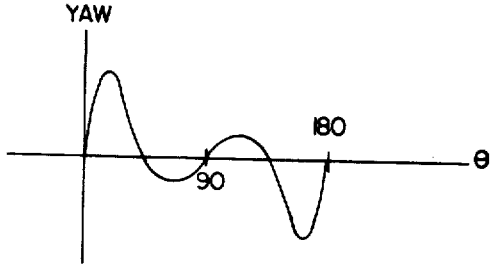
FIG. 7
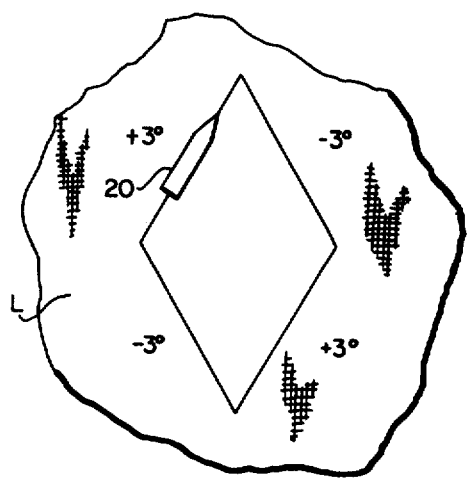
FIG. 8

METHOD AND APPARATUS FOR CUTTING SHEET MATERIAL WITH IMPROVED ACCURACY

This is a division of application Ser. No. 790,035 filed Apr. 22, 1977 now U.S. Pat. No. 4,133,234.

CROSS REFERENCE TO RELATED APPLICATIONS

This application contains subject matter related to U.S. application Ser. No. 790,149 filed Apr. 22, 1977, now U.S. Pat. No. 4,133,235 by the same inventor and entitled Closed Loop Method and Apparatus for Cutting Sheet Material and U.S. application Ser. No. 789,848 filed Apr. 22, 1977, now U.S. Pat. No. 4,140,037 also by the same inventor and entitled Method of Cutting Sheet Material With Scheduled Supplementation.

BACKGROUND OF THE INVENTION

The present invention relates to a method and apparatus for cutting sheet material by means of a cutting blade such as a reciprocating blade. More particularly, the present invention resides in an automatically controlled cutting machine that can be optionally programmed at the machine or operator's discretion to cause special cutting techniques to be utilized by the blade during the cutting operation. The optional programs are selected based on knowledge, testing and prior experience and take into consideration such factors as the type of sheet material being cut, the special features or contours of the patterns or array of patterns being cut, the proximity of adjacent lines of cut, the depth of the sheet material and the desired accuracy of the finished product.

The techniques of controlling the motions of a cutting blade as it advances along a cutting path through a layup of sheet material are based partly on technical reasoning and partly on experience in the art. For example, in U.S. Pat. Nos. 3,855,887 and 3,864,997 issued to Pearl and Robison and having the same assignee as the present invention, a yawing technique is disclosed and claimed for controlling a reciprocating cutting blade as it advances along a cutting path in close proximity to adjacent cuts. Such technique comprises rotating the cutting blade slightly out of a position tangent to the cutting path and away from a previous adjacent cut to prevent the cutting blade from jumping into the previous cut as a point of tangency is approached.

The special techniques for controlling motions of a cutting blade cause the blade to track a desired cutting path with minimal error in spite of the complex loading of the blade which affects its cutting operation, particularly in multi-ply layups of sheet material. Stress and strain within the blade cause the blade to deviate from a desired cutting path in spite of the accuracy with which servomechanisms or other positioning mechanisms locate the blade, and without the special techniques, the deviations are often sufficient to produce cutting errors which are too significant to be ignored.

Several objects are achieved by the special techniques of controlling blade motions. First of all, it is highly desirable to have uniformity among pattern pieces which are cut at different positions in a multi-ply layup of sheet material. Such uniformity enables pattern pieces to be interchanged and assembled in a finished product such as an item of upholstery or a garment with greater ease and consistent quality.

Secondly, with greater assurance that the cutting blade will track a desired cutting path, pattern pieces may be more closely packed in the marker or array of pattern pieces cut from a piece of sheet material. Closer packing conserves material and since the material is a significant factor in the cost of a finished product, the product can be manufactured at a lower cost.

It has been found from experience that the special cutting techniques are not always needed. Some sheet materials or markers can beccut quite satisfactorily without adapting the machine to use special techniques and, in fact, if the techniques are employed, the resulting pattern pieces may be less accurate because of different material behaviors and cutting conditions. On the other hand, the special techniques may be employed advantageously in other situations and, it is desirable to have the option of employing the techniques.

In the prior art U.S. Pat. Nos. 3,855,887 and 3,864,997 referenced above, the special cutting techniques are integrated into the cutting program at the digitizing stage. Therefore, it was not possible for the operator or the cutting machine to be selective in the employment of the techniques after the contours were set in the digitized data.

Furthermore, the special cutting techniques disclosed in the referenced patent were employed only in limited circumstances. It has been determined, however, that a more general application of special techniques is needed if discretion to use the techniques is to be allowed. Accordingly, new techniques have been conceived which have broader application, and it is these techniques that form the basis of the optional programs of the present invention.

Accordingly, it is a general object of the present invention to provide method and apparatus for cutting sheet material by introducing special cutting techniques into a cutting operation when needed or desired. It is a further object of the invention to disclose new cutting techniques which are suitable for general application to the cutting of pattern pieces, especially when the techniques are offered as optional cutting programs.

SUMMARY OF THE INVENTION

The present invention resides in a method and apparatus for cutting pattern pieces from sheet material with special cutting techniques or blade maneuvering.

Pattern pieces are cut from sheet material with an automatically controlled cutting machine in accordance with data defining the contours of the pattern pieces and their positional relationship with one another and the boundaries of the sheet material from which they are cut. The data are used in a data processor or other device to generate machine command signals for translating a cutting blade and the sheet material relative to one another along a cutting path which corresponds to the contours of the pattern pieces. The data processor also provides blade rotation signals which rotate the cutting blade into a position generally aligned with the cutting path at each point.

In implementing the present invention, one or more optional programs are established and stored in a memory device associated with the data processor, and these programs are called upon when special cutting techniques are desired or needed by the machine. In such cases, the optional program is selected and activated to generate machine command signals which, for example, maneuver or yaw the cutting blade slightly out of a position in alignment with the cutting path. In instances where special yawing techniques are desired, the optional program produces yaw signals which are combined with calculated blade rotation signals to produce modified blade rotation signals. Accordingly, the cutting blade and sheet material are advanced relative to one another along a cutting path in accordance with modified machine command signals to produce slightly different and improved results.

Since it is not always desirable to employ special cutting techniques or the same cutting technique, the cutting machine is provided with program selector means to give the machine or operator the option of selecting a program that most suitably adapts the cutting machine to a particular situation. The selector means includes means for adjusting the degree of signal modification as well as the type of modification.

BRIEF DESCRIPTION OF THE DRAWINGS

FIG. 1 is a perspective view illustrating an automatically controlled cutting machine in which the present invention is employed.

FIG. 3 is a front view of a program selector panel forming part of the computer of the present invention.

FIG. 6 is a schematic plan view of a layup and illustrates a cutting blade advancing through a woven, anisotropic sheet material having fibers of different strength in different directions.

FIG. 7 is a diagram illustrating a schedule of yaw compensation in one optional program of the present invention.

FIG. 8 is a fragmentary plan view of a sheet material layup and illustrates schematically the effect of the program shown in FIG. 7.

FIG. 9 is a fragmentary side elevation view illustrating a reciprocating cutting blade and a transducer for dynamic control of the blade.

FIG. 10 is a front elevation view of the cutting blade in FIG. 9, and illustrates blade bending resulting from lateral blade loading.

FIG. 11 is a diagram illustrating the characteristic transfer function of another optional yaw program employing blade loading feedback.

DESCRIPTION OF THE PREFERRED EMBODIMENTS

Figure 2:
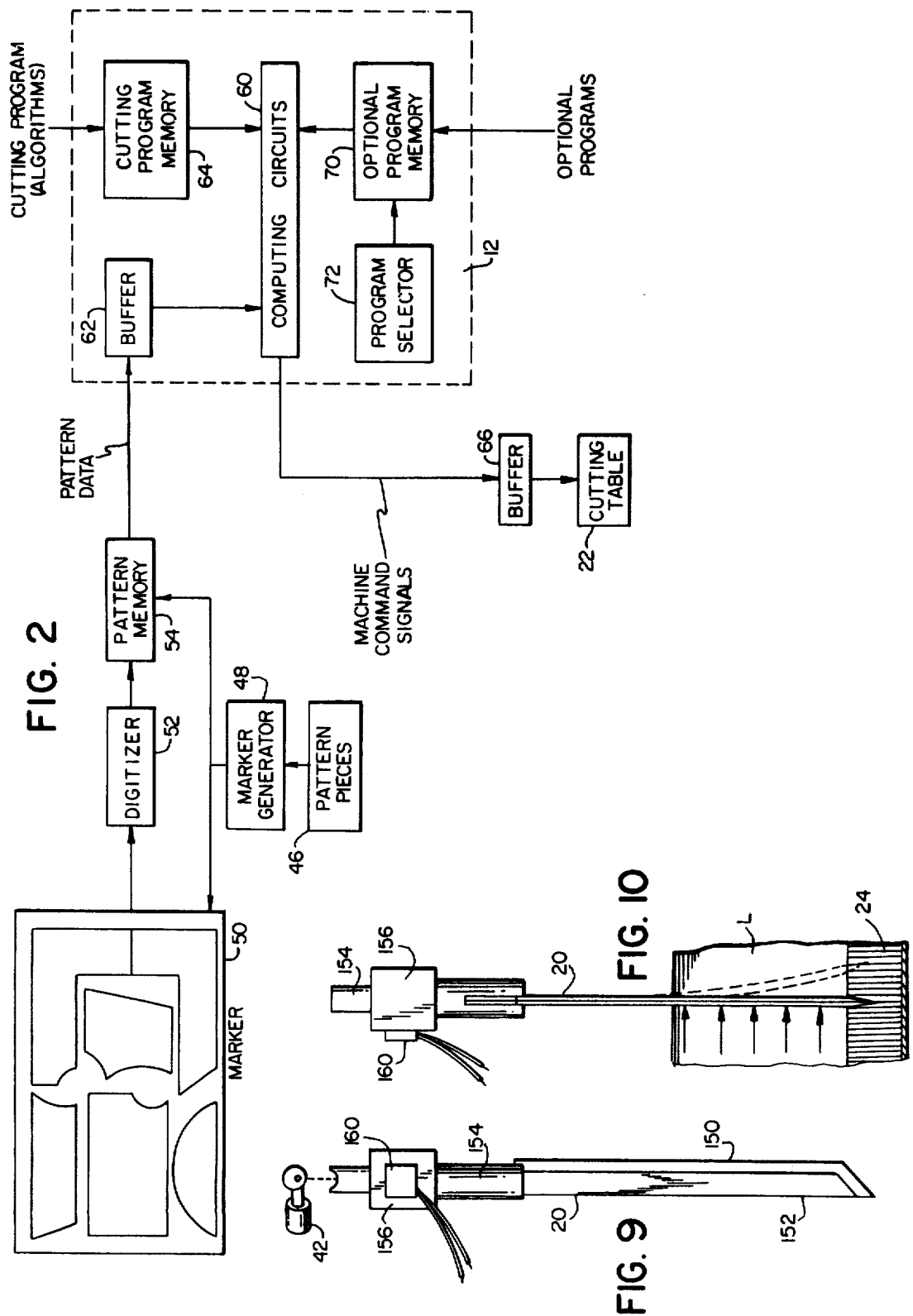
FIG. 2 is a schematic diagram illustrating in operational relationship the principal components which are employed in an automatic cutting process.

FIG. 1 illustrates an automatically controlled cutting machine, generally designated 10, of the type shown and described in greater detail in U.S. Pat. No. 3,495,492 having the same assignee as the present invention. The cutting machine 10 is utilized to cut a marker of pattern pieces from single or multi-ply layups L of sheet material such as woven and nonwoven fabrics, paper, cardboard, leather, rubber, synthetics and others. A marker is a closely packed array of pattern pieces as they are cut from the material. The illustrated machine 10 is a numerically controlled machine having a controller or computer 12 serving the function of a data processor and a cutting table 22 which performs the cutting operation on sheet material in response to machine command signals transmitted to the table from the computer through the control cable 14. The computer 12 reads digitzed data from a program tape 16 defining the contours of the pattern pieces to be cut and generates the machine command signals guiding a reciprocating cutting blade 20 as the cutting operation is carried out. The present invention, however, is not limited to the disclosed numerical control system and has utility with other real time or preprocessed data systems including line followers and analog systems.

The cutting table 22 as disclosed has a penetrable bed 24 defining a flat surface supporting the layup L during cutting. The bed may be comprised of a foamed material or preferably a bed of bristles which can be penetrated by the reciprocating cutting blade 20 without damage to either as a cutting path P is traversed. The bed may also employ a vacuum system such as illustrated and described in greater detail in the above-referenced U.S. Pat. No. 3,495,492 for compressing and rigidizing the layup firmly in position on the table.

The cutting blade 20 is suspended above the support surface of the bed 24 by means of an X-carriage 26 and a Y-carriage 28. The X-carriage translates back and forth in the illustrated X-coordinate direction on a set of racks 30 and 32. The racks are engaged by pinions driven by an X-drive motor 34 in response to command signals from the computer 12. The Y-carriage 28 is mounted on the X-carriage 26 for movement relative to the X-carriage in the Y-coordinate direction and is translated by the Y-drive motor 36 and a lead screw 38 connected between the motor and carriage. Like the drive motor 34, the drive motor 36 is energized by command signals from the computer 12. Coordinated movements of the carriages 26 and 28 are produced by the computer in response to the digitized data taken from the program tape 16 and guide the reciprocating cutting blade 20 along a cutting path P. Thus, the cutting blade is utilized to cut pattern pieces over any portion of the table supporting the sheet material.

The cutting blade 20 is suspended in cantilever fashion from an adjustable platform 40 attached to the projecting end of the Y-carriage 28. The adjustable platform elevates the sharp, leading cutting edge of the blade into and out of cutting engagement with the sheet material. The blade is reciprocated by means of a drive motor 42 supported on the platform 40. Another motor (not shown) on the platform rotates or orients the blade about a $\theta$-axis perpendicular to the sheet material and generally aligns the blade with the cutting path at each point. For a more detailed description of the blade driving and supporting mechanism, reference may be had to U.S. Pat. No. 3,955,458 issued May 11, 1976 to the assignee of the present invention. Of course, other types of cutting blades such as band blades shown in U.S. Pat. No. 3,350,969 and rotary cutting blades shown in U.S. Pat. No. 3,776,072 may be used. Furthermore, the cutting blade need not be completely cantilevered from the platform 40 for penetration into the bed 24, but can cooperate with a blade guide and foot which travels under the layup as shown in U.S. Pat. Nos. 1,172,058 or 3,245,295.

FIG. 2 illustrates the major components employed by the machine 10 in an automatic cutting process. The primary input data for the machine are the contours of the pattern pieces 46. An automatic marker generator 48 may be utilized to arrange the pattern pieces in positional relationships which correspond with the relationships of the pieces when they are cut from the sheet material. The marker generator 48 may be an automatic computerized type disclosed in U.S. Pat. No. 3,596,068. Computerized marker generators which are fully automated include a packing subroutine that in effect shifts and bumps the pattern pieces together within the boundaries of a marker until the amount of material required to cut the pieces is a minimum. As would be expected, the pattern pieces in the marker after packing contact one another and have points of tangency, points of close approach, common contour segments between adjacent pieces and closely spaced parallel segments. It is these conditions and others which require special cutting techniques as described below.

Of course, the marker can also be generated manually or semi-automatically. In the manual process, cardboard representations of the patterns are shifted on a table until the most compact array is obtained. In the semi-automatic process, an interactive graphics system is employed. In this system, the pattern pieces are displayed on a tablet or the screen of a cathode ray tube (CRT) connected to a data computer which generates the display. An indexing instrument such as an electrical wand or light pen interacts with the tablet or CRT and permits the pieces to be shifted to various positions. By a trial-and-error process resembling the entirely manual process, the closely packed array is obtained and when the final grouping is arrived at, the array is frozen.

Regardless which process is utilized, the marker 50 or data defining the marker becomes the input of the automatically controlled cutting machine. The marker for the numerically controlled cutting machine must be reduced to digital data which can come from the marker generator itself, and in this case the data is supplied directly to a pattern memory 54. The pattern memory can be a deck of punched cards or magnetic or perforated tape such as the tape 16 illustrated in FIG. 1.

If digitzed data identifying the contours and positions of the pattern pieces has not already been generated in the course of generating the marker 50, then the digitizer 52 is operated to reduce the pattern contours in the marker to point data. The digitzer may be a manually operated digitizer or a line follower which outputs the data automatically and places it in the pattern memory 54. Thus, the contours of the pattern pieces are defined in the memory as a series of digital commands representing straight or curved line segments identified by the X- and Y-coordinates associated with end points of each segment.

The principal components of the computer 12 and the basic inputs supplied to the computer are also shown in FIG. 2. The principal input, of course, is pattern data from the memory 54. The computer also receives a cutting program which is comprised of standard servo and curve algorithms. Such algorithms define machine command calculations peculiar to the cutting table 22 and take into consideration limitations such as the maximum rate of acceleration. The algorithms also determine when to lift or plunge the blade along a cutting path and determine other functions which in summary comprise all the routine operations performed by a cutting blade and any accessories during a cutting operation. In accordance with the present invention, the computer also receives optional programs, as explained in greater detail below.

The pattern data stored in the memory 54 are acted upon by computing circuits 60 within the computer to reduce the data to machine commands that are output in real time in a form intelligible to servomotor drivers on the cutting table. The pattern data enters the computer through a buffer 62 and the computing circuits read the data as needed. In the course of a computing operation, the circuits are controlled by the cutting program which is stored in a memory 64. The machine commands are output from the computer in the form of electrical signals and may be applied directly to the cutting table 22 at a controlled rate or the signals may be stored in a buffer 66 for use on demand. With the exception of the optional program memory 70, the program selector 72, and associated circuits described below, the system illustrated in FIG. 2 is conventional and well known in the numerical control cutting field.

The basic or fundamental machine command signals generated from the digitized pattern data by the computing circuits include X and Y displacement signals applied to the servomotors 34 and 36 in FIG. 1 to cause the cutting blade 20 to be translated relative to the sheet material along the cutting path. In order to raise and lower the cutting blade in and out of cutting engagement with the sheet material, "blade up" or "blade down" signals are also generated. In the present embodiment of the invention, a blade rotation signal is calculated in the computer from the digitized data to orient the cutting blade about the $\theta$-axis tangent to the cutting path at each point along the path. Thus, the displacement signals, the "up" or "down" signals and the rotation signals completely define the basic motions of the cutting blade which cause the blade to traverse a specific path in cutting relationship with the sheet material.

A principal feature of the present invention is the inclusion of an optional program memory 70 and a program selector panel 72 in the computer. The optional memory 770 is connected with the computing circuits, and the computing circuits utilize the optional programs when selected by the machine operator to modify the basic of fundamental machine command signals. By providing a number of optional programs in the memory 70, the machine operator or other person is given the choice of that program which according to his knowledge, testing and prior experience produces the most accurate pieces with the least difficulty and minimum expenditure of time. Some of the factors taken into consideration are the type of material being cut, the special features or contours of the patterns or array of patterns, the proximity of adjacent lines of cut, the depth of the layup and the permissible tolerances of the cut pattern pieces. The automatically controlled cutting machine with the optional program memory 70 and selector panel 72 is more versatile because marker patterns can be cut from sheet material with or without special cutting techniques defined in the optional programs. Giving the operator discretion in controlling the cutting blade constitutes a significant improvement in the art, since previously cutting has been restricted by the fixed program generated from the digitized data in the memory 64.

Specific optional programs considered desirable in improving the cutting accuracy involve yawing of the cutting blade. Yaw refers to the difference between the blade angle relative to some reference line and the velocity vector, or an angular rotation or biassing of the cutting blade out of a position generally aligned with or tangent to the cutting path, the angular amount of such yawing generally not exceeding 10° (although values as high as 25° or more may be used) and more frequently falling within the range of 0–5°. While it may appear inconsistent to rotate the blade out of a position in alignment with the cutting path in order to improve accuracy, such practice is useful for this purpose because of lateral forces that are applied to the blade and cause the blade to track a path different from that in which the blade is headed.

Since blade yawing is fundamentally a rotation of the blade, the incorporation of an optional yawing program with the conventional cutting program consists of combining yaw commands with the conventional blade rotation commands that normally establish alignment with the direction of the cutting path at each point. FIG. 4, accordingly, illustrates in a flow diagram the θ-channel subroutine of the computer 12 associated with the determination of the blade rotation command signals, such signals defining rotation of the blade about the θ-axis perpendicular to the table bed 24. Illustrated in FIG. 4 are a number of optional yaw programs that are stored in the memory 70. Each of these programs is described below in connection with the operation of the subroutine.

As each data point is processed by the computer 12, the θ-channel subroutine is entered at 80 and in conjunction with data defining adjacent line segments of the desired cutting path, the angle at the point in question between the adjacent line segments is calculated at 82. Such angle is then added to the existing blade rotation value at 84 so that under normal circumstances and in the absence of any special yaw commands, the cutting blade is commanded to move along the programmed cutting path in alignment with the path.

In accordance with the present invention, however, the blade rotation signal is then processed through an interrogation gate 86 in the computing circuits 60 or the optional program memory 70 shown in FIG. 2. The gate 86 is controlled by the program selector panel 72 shown in FIG. 2 and in greater detail in FIG. 3. The panel has a "fixed" switch 88 and when the switch 88 is depressed by the machine operator, the gate 86 activates the fixed yaw program.

The fixed yaw program adds a predetermined amount of yaw bias or compensation to the rotation calculated at 84, and the angular amount is constant or the same at each point on the cutting path but can be adjusted by the operator by means of the adjustment dial 90 on the selector panel. The amount selected can be read from the indicator meter 92 adjacent the dial. The sense or direction of the yaw bias is also established by the dial 90 and, thus, it is apparent that the bias may rotate the cutting blade slightly to one side of the line of cut or the other. Preferably, the bias is adjusted to rotate the cutting blade inwardly of the pattern piece so that closely adjacent pattern pieces will not inadvertently be cut as the cutting blade passes points of tangency or closest-approach. If a pattern piece is digitized in the clockwise direction, then the cutting blade traverses the pattern piece periphery in the same direction. If the cutting blade is to be yawed toward the inside of the pattern piece, the blade must be rotated clockwise about its axis of reciprocation, which is designated a positive bias as shown by the meter 92 in FIG. 3. However, if a pattern piece has been digitized in a counterclockwise direction, the operator is advised of this fact by means of the indicator light 94 which responds to information stored in the digitized pattern data. In such case, the sense of the bias must be reversed in order to maintain a yaw bias toward the inside of the pattern.

Figure 4A:
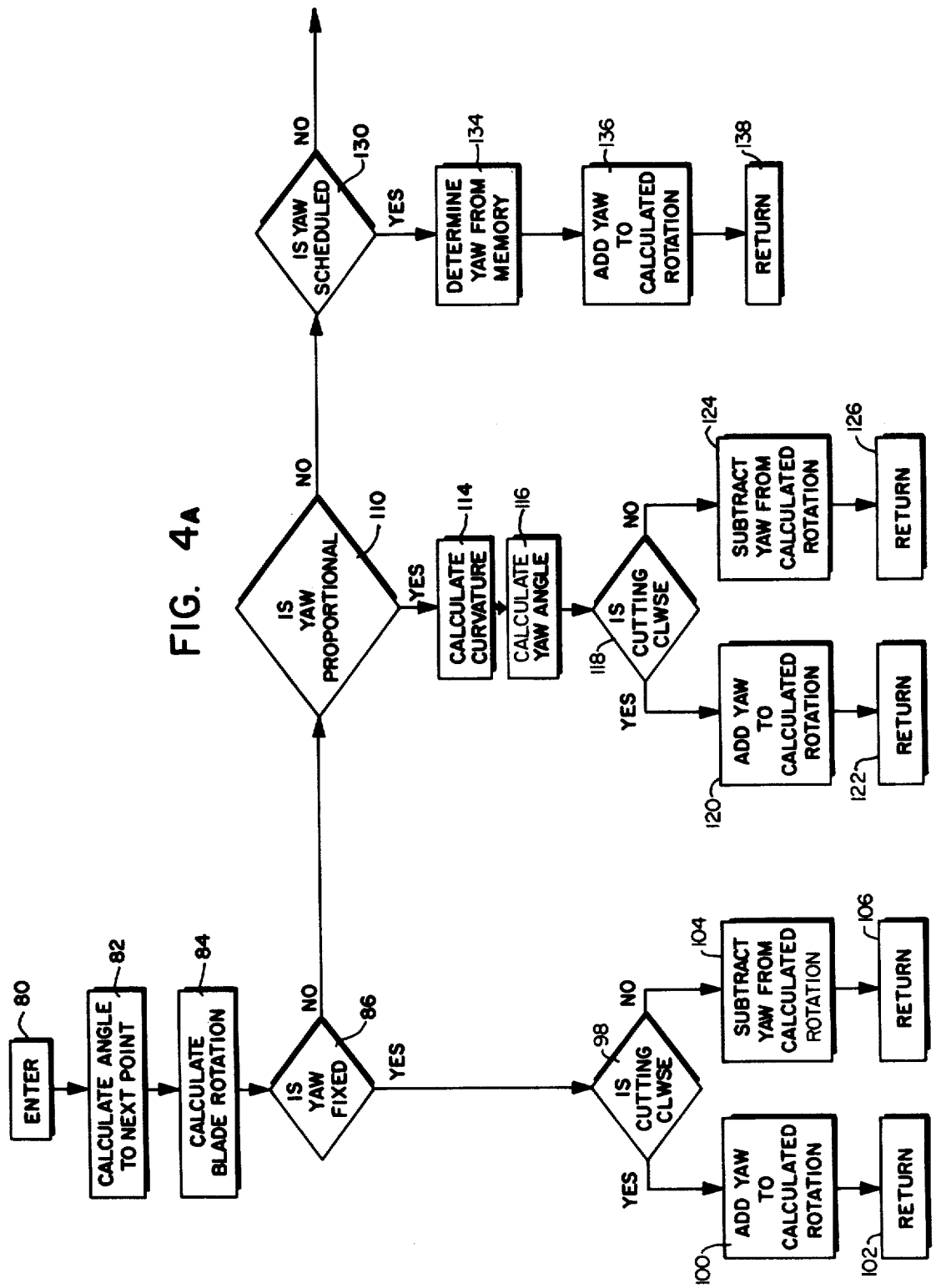
FIGS. 4a and 4b are a flow chart illustrating the $\theta$-channel subroutine in the computer which generates machine command signals controlling blade orientation during cutting.

The fixed yaw program stored in the optional program memory 70 is illustrated in detail in FIG. 4a under the "yes" branch of the interrogation gate 86. Since it is desirable to know the direction in which the cutting blade traverses the pattern piece, gate 98 is provided. If the blade traverses the pattern clockwise, then the fixed yaw angle determined by dial 90 is algebraically added at 100 to the blade rotation angle calculated at 84 and the subroutine is exited at 102. If blade motion is counterclockwise, then the fixed yaw angle is algebraically subtracted from the calculated angle at 104, and the subroutine is exited at 106.

Figure 5:
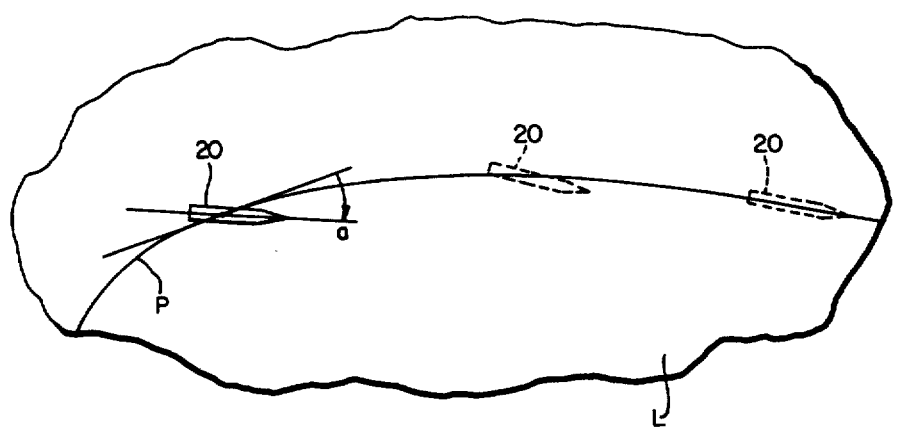
FIG. 5 is a fragmentary plan view of a sheet material layup and illustrates schematically a special cutting technique for controlling blade orientation in accordance with one aspect of the present invention.

If a fixed yaw program has not been selected by the operator at gate 86, then a proportional yaw program is examined at interrogation gate 110. The proportional yaw program is illustrated more clearly by the fragmentary plan view of the layup L in FIG. 5 where the cutting blade 20 is shown at different points along the cutting path P.

In general, the proportional yaw program establishes a yaw angle which is calculated to be proportional to the curvature of the cutting path at the point in question. As shown in the solid-line position of the blade 20, the blade is rotated to an angle a relative to the tangent of the cutting path at that point. The angle a is greatly exaggerated for clarity and normally would not exceed the 10° limitation discussed above. At the next point illustrating the cutting blade 20 in phantom, the angle between the cutting path and the blade is somewhat less due to the smaller curvature of the path at that point. At the last position of the cutting blade also illustrated in phantom, the cutting path P is straight and thus, the yaw angle is zero so that the blade appears generally aligned with the cutting path. The control of yaw bias in proportion to curvature of the path is regarded to be useful because the blade rotation tends to redirect the blade in the new direction which the blade is expected to assume after some finite displacement. Thus, the blade tends to anticipate its next position, and the effects of lateral forces which are produced on the blade are reduced if not eliminated. Since a greater response is needed with increased curvature of the path, the yaw bias of this program is made proportional to curvature. The proportionality factor may be established by a number of factors such as the material being cut, the blade configuration and the depth of the layup, and it is advantageous to be able to vary the factor accordingly.

Proportional yaw bias is selected by the machine operator by means of the "proportional" switch 112 on the selector panel of FIG. 3. When the switch is depressed, the gate 110 in FIG. 4a activates the proportional program routine associated with the "yes" branch of the gate. As each digitized data point along the pattern piece periphery is processed, the path curvature at the point is calculated at 114. Such calculations are well known in the prior art since the velocity profile of the cutting blade movement is also based upon path curvature. The yaw bias or angle proportional to curvature is then calculated at 116. If cutting is determined to be clockwise at gate 118, the proportional yaw angle is algebraically added at 120 to the blade rotation calculated at 84 and the subroutine is exited at 122. If cutting is counterclockwise, then the proportional yaw is algebraically subtracted at 124 from the calculated blade rotation and the subroutine is exited at 126. Alternatively, blade rotation could be calculated with a multiplying or other factor which is varied as a function of path curvature.

If proportional yaw has not been selected by the machine operator, the interrogation gate 130 is examined to determine if a scheduled yaw program has been selected. The gate 130 is energized by the machine operator from the "scheduled" switch 132 on the selector panel in FIG. 3. A scheduled yaw program is a program in which yaw angles are empirically determined or set at preselected values which have proven to be particularly effective under given cutting conditions.

As an example, FIG. 6 illustrates in plan view a cutting blade 20 advancing through a sheet of woven material having anisotropic strength characteristics. In particular, the matrix of fibers which form the woven material are comprised of one set of fibers S extending in one direction and being particularly stronger than another set of fibers W extending perpendicular to the fibers S. Such anisotropic characteristics are found in many fabrics such as denim and fabrics in which synthetic fibers are mixed with natural fibers. It has been found that the amount of yaw needed to maintain the cutting blade on the cutting path when the blade is traveling in one direction relative to the fibers is different from the amount needed when the blade is traveling in another direction. It is believed that the explanation for such differing values is the fact that the stronger fibers encountering the sharp, leading cutting edge of the blade have a different influence on the cutting action of the blade than the weaker fibers. Also the strong and weak fibers may possess different spring and cutting characteristics which cause the fibers to deflect away or recede from the angularly oriented blade in different fashion. When the blade is traveling at an angle to the stronger fibers with the tapered forward side of the blade almost parallel with the stronger fibers as shown in FIG. 6, the stronger fibers are first pushed and exert greater diverting forces on the one side of the leading edge than the weaker fibers on the other side and, consequently, greater yaw compensation is required. On the other hand, when the blade moves transverse to the stronger fibers, the effect on the one side of the cutting edge is substantially the same as that on the other side and no compensation is required. The same is true when the blade is traveling transverse to the weaker fibers. A similar effect can be observed with knitted materials.

Such a theory is confirmed by cutting test lines or patterns of given shape such as shown in the plan view of FIG. 8 and orienting the lines or patterns at different angles to the fibers in different tests. This testing and cutting procedure is described in greater detail in the above-referenced patent application Ser. No. 789,848, now U.S. Pat. No. 4,140,037 entitled Method of Cutting Sheet Material with Scheduled Supplementation.

As the cutting blade 20 traverses the test pattern in FIG. 8, the lateral forces generated between the woven material and the cutting blade are measured or the cuts are checked afterward. The angle of the blade is then adjusted by introducing a certain amount of yaw and the test is continued or repeated until the yaw angles that counteract and null out the lateral forces or produce accurate cuts are established. It is noted from the yaw compensation angles shown in the example of FIG. 8 that for a null loading and maximum accuracy or identity of patterns, the same yaw bias or compensation angle is required along parallel sides of the test pattern, but each pair of parallel sides requires different compensation. Such compensation can be related to the strength and orientation of fibers in the material.

When the lines or test pattern are rotated to a slightly different angle relative to the fibers, another test is performed to establish other values of yaw for null loading. At the conclusion of a number of tests, a schedule of yaw angles for finitely different cutting directions has been determined and by interpolation, a complete schedule of angles can be had for all directions. FIG. 7 is a diagram illustrating an exemplary schedule of yaw angles as a function of the angle $\theta$ or the direction in which a cutting path extends through anisotropic material. It will be observed that the schedule varies through a 180° cycle as implied by the yaw angles illustrated in FIG. 8. It should, however, be understood that other schedules of yaw compensation may be established for other types of cloth and cutting conditions.

A particular schedule of yaw angle values may be readily programmed in the optional program memory 70 or for ease of programming a separate memory taking the form of a tape reader 133 and exchangeable tape cartridges 135 may be placed in the selector panel as shown in FIG. 3. When the interrogation gate 130 has activated the scheduled program, the yaw value is determined at 134 from the appropriate memory. The value is then added at 136 to the blade rotation value calculated at 84 and the subroutine is exited at 138. It will be readily appreciated that the number of scheduled yaw programs stored in the memory 70 is limited only by the memory capacity provided that a suitable selecting switch on the program selector panel 72 is provided. If exchangeable tape cartridges are utilized, the number of programs is unlimited.

Figure 4B:
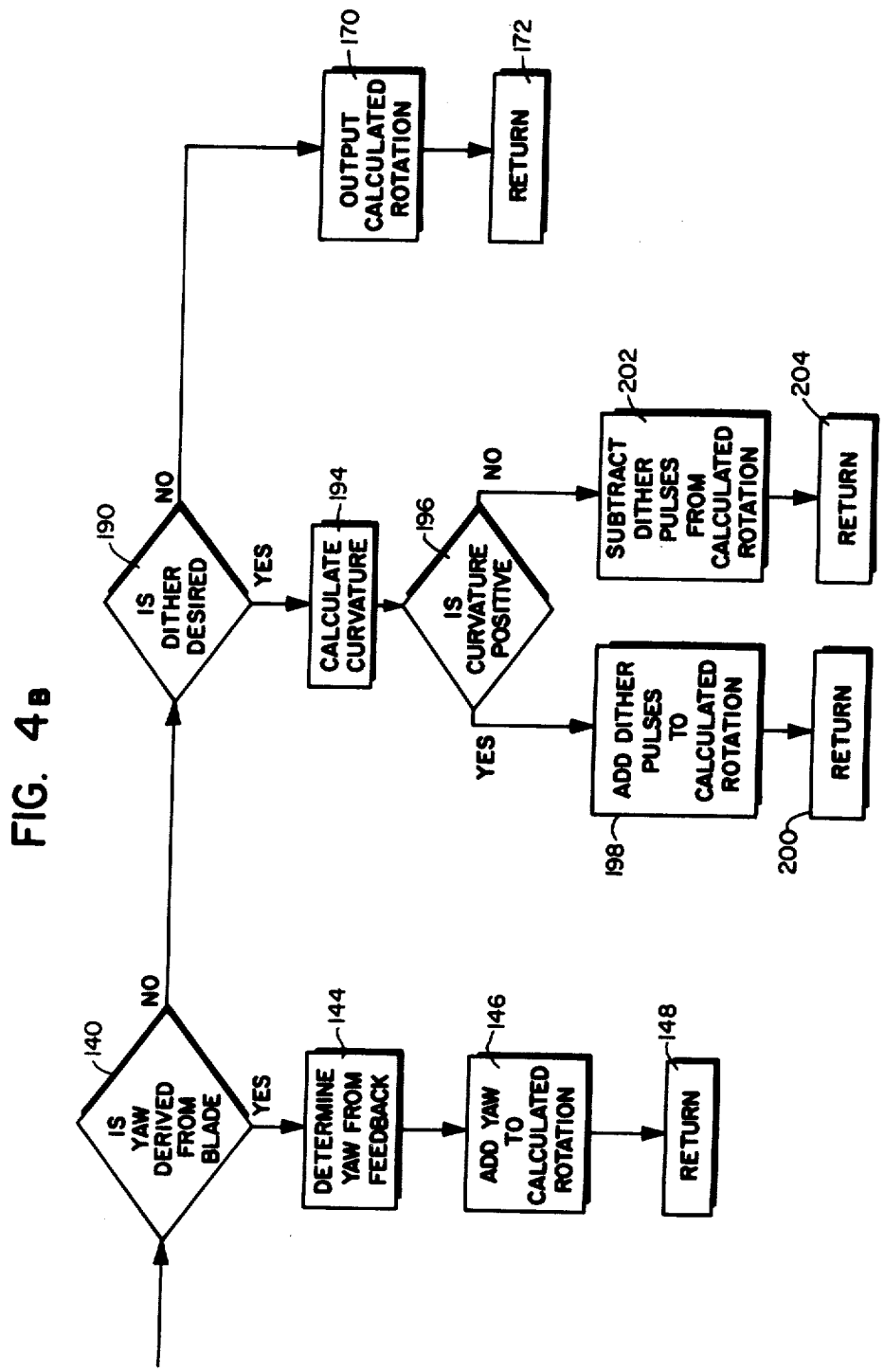

If the gate 130 has not been energized, a dynamically derived yaw program may be selected by the machine operator through the interrogation gate 140 in FIG. 4b by means of the "derived" switch 142 in FIG. 3. The yaw program in this instance is obtained from cutting parameter signals fed back to the computer 12 from a sensor or transducer monitoring the cutting operation as it progresses. The feedback signals produced by the transducer are then converted into yaw signals as shown at 144 in FIG. 4b. The yaw signal derived in this fashion is then added at 146 to the blade rotation calculated at 84 and the subroutine is exited at 148. The procedure utilizing cutting parameter feedback is the subject of the patent application Ser. No. 790,149, now U.S. Pat. No. 4,133,235 entitled Closed Loop Method and Apparatus for Cutting Sheet Material referenced above.

As an example of apparatus for monitoring cutting parameters while the cutting operation progresses, reference is made to FIGS. 9-11. In FIGS. 9 and 10, the generally flat cutting blade 20 having a sharp leading edge 150 and a parallel trailing edge 152 is mounted in a rod 154 reciprocated within a carriage-mounted sleeve 156 by means of the drive motor 42. A strain gauge transducer 160 is mounted on the side of the sleeve 156 to measure lateral loading on the cutting blade. As shown in FIG. 10, such loading, which can be generated by the sheet material through which the blade passes, bends the blade to the phantom position and thus causes the lower portion of the cutting blade to track a different cutting path and produce a different pattern piece than the upper portion of the blade. Such loading and its effect on the motion of the cutting blade can be corrected by introducing a yaw angle that generally counteracts the effects of the lateral forces and permits the cutting blade to continue along the desired line of cut as suggested above with the scheduled yaw program.

To this end, the transducer 160 measures the lateral loading on the cutting blade and produces feedback signals proportional to the loading. Within the computer 12, such feedback forces may be operated upon by a program having a linear relationship or transfer function such as shown in FIG. 11. Basically, when the feedback force F is detected, the amount of yaw bias is calculated to be proportional to the force and opposite in sense. Of course, other feedback signals and other linear or non-linear functions may be utilized to dynamically calculate or or establish the value of yaw in any given case.

If the interrogation gate 140 in FIG. 4b has not activated the derived program, then the interrogation gate 190 is examined. The program associated with gate 190 adds a schedule of yaw dither to the machine commands controlling blade orientation and causes the blade to intermittently and rapidly rotate by preselected amounts out of the position in alignment with the cutting path and back again without traversing a substantial segment of the cutting path during rotation. Such intermittent rotations are desirable when, for example, the cutting blade 20 is receiving unbalanced lateral loading from limp sheet material due to the absence or lack of lateral support at one side of the blade near the edges of the layup or at closely adjacent cuts, or when the blade loading is unbalanced because of anisotropic material characteristics as described in connection with FIG. 6. The blade is preferably rotated toward the side of the path from which the greatest lateral loading is applied and thus in the case of traversing a curve, the blade is intermittently rotated toward the inside of the curve or in the case of anisotropic materials, the blade is rotated toward the stronger fibers. The abrupt rotation as the blade advances cuts the material in a stepwise fashion and relieves the loading and blade stress caused by the material.

Figure 13:
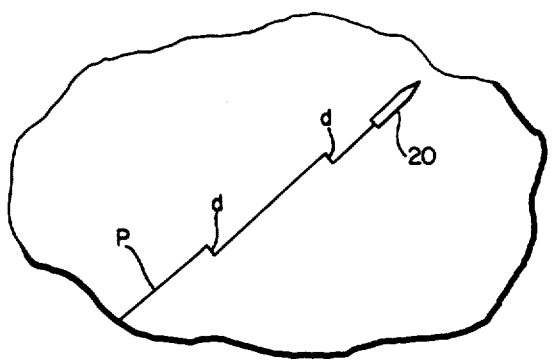
FIG. 13 is a fragmentary plan view of a layup and illustrates a cutting path produced when dither is applied to the cutting blade.
Figure 14:
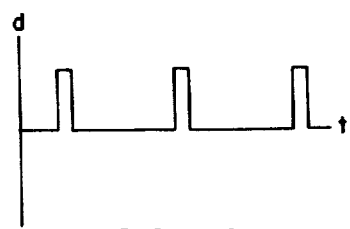
FIG. 14 is a diagram illustrating a schedule of command pulses producing the blade dither in FIG. 13.

FIG. 13 shows a fragmentary view of the layup L and the cutting path P traversed by the blade 20 when dither is imposed upon the blade motion. It is assumed that the right side of the blade experiences heavy, lateral loading under the conditions illustrated and, therefore, the small steps d in the cutting path are generated to the right. The illustrated steps d are greatly exaggerated for clarity and would barely be noticeable in a cut pattern piece as long as the amount of dither is limited to, for example, no more than 10° and is executed within a short segment of the path. FIG. 14 illustrates a time schedule of dither command pulses that produce the cutting path shown in FIG. 13. The width of each pulse should be relatively short, and the frequency of the pulses may be selected in accordance with the speed of the blade or curvature of the path so that the advancing blade stays generally on the desired cutting path.

The dither program associated with the "yes" branch of the interrogation gate 190 is activated by the control switch 192 on the selector panel 72 in FIG. 3 and may take several different forms depending upon how dither is to be applied. The program illustrated in FIG. 4b applies dither to the calculated blade rotation as a function of path curvature and thus curvature is determined at 194. Since dither should rotate the blade inwardly of the curve, the sense of the curvature is determined at 196. If curvature is regarded to be positive in one sense, then dither pulses are added to the calculated rotation at 198 tand preferably the pulses are added at a rate along the cutting path proportional to curvature. In other words, if the curvature is severe, then dither pulses are added more frequently whereas if the curvature is mild, the dither pulses are less frequent. The program is then exited at 200. If the curvature is negative in sense, then the dither pulses are subtracted from the calculated rotation at 202, again at a rate proportional to the curvature, and the program is exited at 204. Of course, dither may be made a function of a single variable or a combination of variables such as curvature and the angular relationship of the cutting path and the fibers in woven sheet material. Still other forms of dither may be employed in accordance with the particular cutting problem being addressed. Although the flow diagram of FIG. 4 suggests that the dither program is utilized alone, it is also feasible to employ dither in combination with other optional programs.

In the event that the machine operator has not selected any of the yaw programs in the optional program memory and correspondingly, none of the programs have been activated by means of the interrogation gates 86, 110, 130, 140 or 190 in FIG. 4, then the subroutine outputs the calculated blade rotation at 170 without yaw bias and exits at 172.

Figure 12:
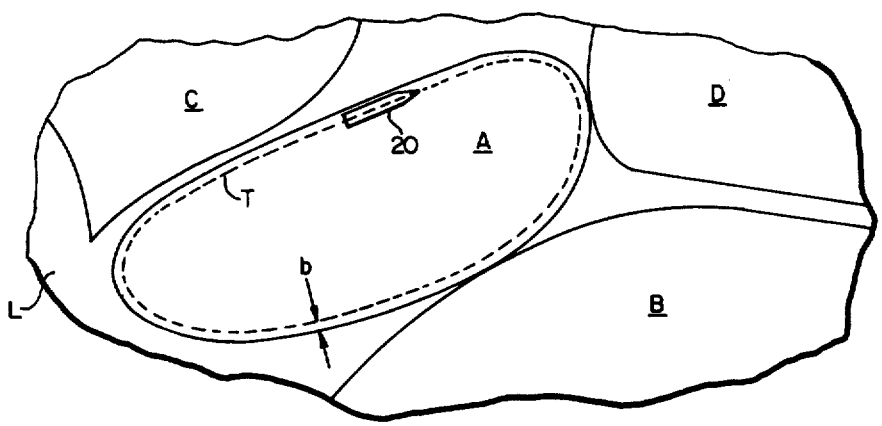
FIG. 12 is another fragmentary plan view of the sheet material layup and illustrates the offset cutting technique.

An alternate method for cutting pattern pieces of slightly different size from sheet material is illustrated in FIG. 12 and may also derive benefits from an optional cutting program in the same manner as the more conventional cutting method which attempts to guide the cutting blade along a cutting path coincident with a pattern piece contour. FIG. 12 is a fragmentary plan view of the layup L at a location occupied by pattern pieces A, B, C and D. The cutting blade 20 is illustrated traversing a dotted cutting path T which is not coincident with the given periphery of pattern piece A, but is similar to the periphery and offset within the periphery by a predetermined amount b. While the pieces cut along the path T will not be precisely the same size as the defined pattern piece A, the difference in size is not materially significant if the offset between the defined periphery and the cutting path is not greater than 1/32nd of an inch (0.8 mm). Normally, pattern pieces are not cut to accuracies greater than 1/32nd of an inch, and consequently, a slightly undersized piece may have little or no adverse effect upon the final product.

From the point of view of cutting, the offset significantly eases the problem of cutting pattern pieces which are closely packed and define long, thin slivers of material in the interstices of the pattern pieces. Pattern piece C does not conform precisely to pattern piece A and thus a very thin and elongated section of cloth separates the pieces when they are closely packed. Pattern piece B is tangent to pattern piece A at one point and defines two slivers of intervening cloth at each side of the point of tangency. A similar condition exists between pattern piece A and pattern piece D. If conventional cutting techniques are employed, that is, the cutting blade 20 is guided along a cutting path coincident with the pattern piece peripheries, difficulties are encountered regardless of which of the pattern pieces is cut first. With the offset as shown and described, these difficulties are considerably eased provided that the cutting blade moves along the offset cutting path accurately. The optional programs described above aid this alternate cutting method in this respect.

While the selection of the optional programs described above is made by the cutting machine operator through the program selector panel 72, such selection can also be made by the computer 12 itself based upon an analysis of the pattern data stored in the pattern memory 54 and the conditions of a given cutting operation. Such analysis would permit tangencies and closely adjacent cutting paths to be identified so that yawing or slowdown could be ordered by selection of the appropriate program. The selection is made, if necessary, due to the depth of the layup being cut, the type of material in the layup and other factors not comprehended by the data stored in the memory 54 or the program in memory 64.

It is also feasible in automated systems having the automatic marker generator 46 to identify the critical locations in a marker, such as points of tangency or close approach and closely adjacent parallel cutting paths, while the marker is being generated. The marker generator then provides information or data identifying the critical locations to the computer 12 so that the computer can select the appropriate optional program based upon analyses of the cutting conditions at the critical locations.

Figure 15:
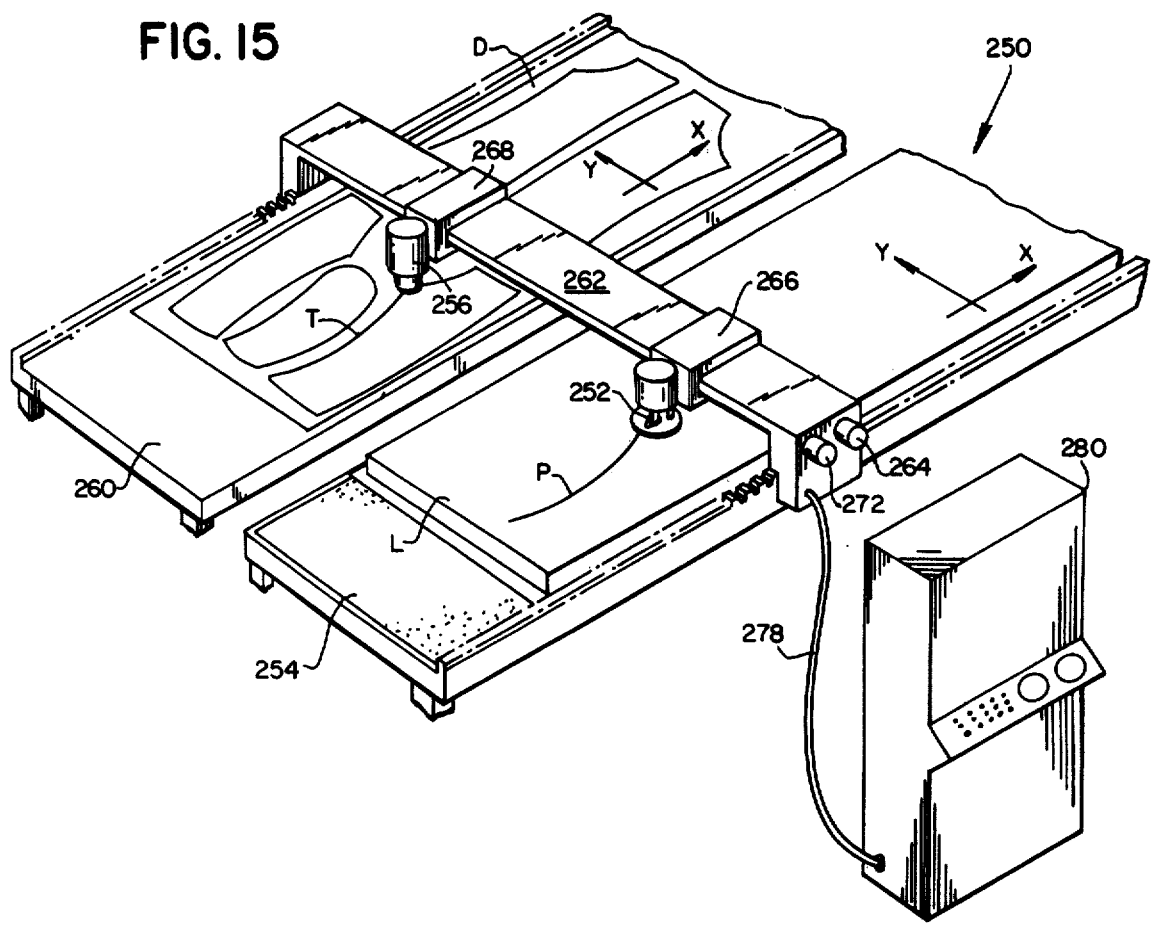
FIG. 15 is a perspective view of an automatically controlled cutting machine in which a line follower is utilized to generate data defining the desired cutting paths.
Figure 16:
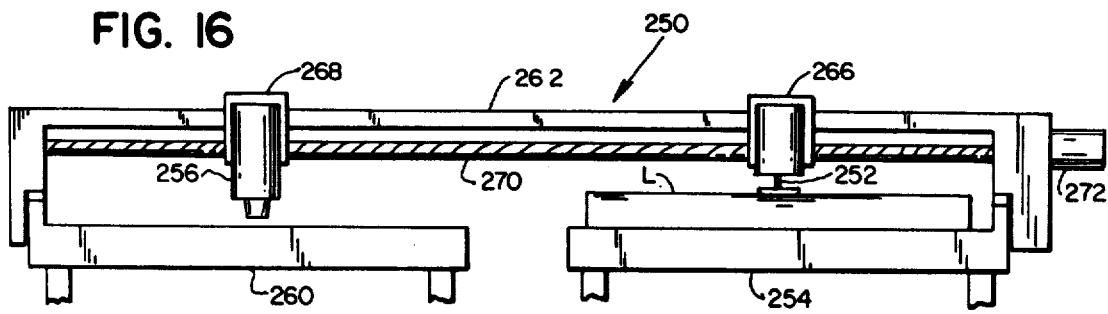
FIG. 16 is an elevation view of the cutting machine including the line follower in FIG. 15.

FIGS. 15 and 16 illustrate another automatically controlled cutting machine, generally designated 250, having a cutting tool in the form of a reciprocated cutting blade 252 guided in cutting engagement with a layup L on a cutting table 254. In this embodiment of the invention, the cutting blade 252 cooperates with a foot (not shown) that travels with the blade under the layup of the sheet material and on top of the table 254. Thus, the table does not have a penetrable bed, although a thin layer of compressible material is desirable between the layup and table to allow the foot to depress the material and pass undisturbingly under the layup as the cutting blade traverses a cutting path. For a more complete description and illustration of such a cutting mechanism, reference may be had to U.S. Pat. No. 3,245,295 issued to Mueller.

The basic data for controlling movement of the cutting blade during a cutting operation is contained in a marker drawing D or other medium such as a template and is obtained by means of a line follower 256. The line follower is a tracking device which at a remote location follows a graphic representation of the cutting path or contours to be cut and correspondingly controls movement of the blade 252 in the layup L at the same time. For example, the drawing D may bear a graphic representation of the marker which is to be cut by the cutting blade 252 in the layup L. During a cutting operation, the line follower advances along the lines T and produces output signals which are operated upon by the computer 262 and which continue movement of the line follower in tracking relationship with the lines. The internal structure and operations of a line follower are well known in the art, and a more detailed description of one such follower may be had by reference to U.S. Pat. No. 3,529,084 issued to Rich.

In the illustrated embodiment of the cutting machine 250, the tables 254 and 260 are positioned in parallel relationship, and a common X-carriage 262 straddles the tables and supports both the cutting blade 252 and the line follower 256 in suspended relationship. The carriage 262 traverses the tables in the illustrated X-coordinate direction by means of an X-drive motor 264 and associated racks (not shown) in a manner similar to that of the X-carriage 26 illustrated in FIG. 1. A Y-carriage 266 supports the cutting blade 252 for movement relative to the X-carriage 262 and the table 254 in the illustrated Y-direction, and another Y-carriage 268 supports the line follower 256 for similar movement relative to the support table 260.

The carriages 266 and 268 are interconnected by means of a lead screw 270 driven by a Y-drive motor 272. Thus, the line follower 256 and the cutting blade 252 are mechanically constrained by the carriages and interconnecting mechanism to move in parallel relationship in both the X- and Y-coordinate directions.

Additionally, the cutting blade 252 is rotated about a $\theta$-axis perpendicular to the cutting table 254 by means of a $\theta$-drive motor 286 (FIG. 17) on the carriage 266, and is elevated in and out of cutting engagement with the layup L by means of another carriage-mounted motor (not shown). The motor (not shown) for reciprocating the cutting blade is also mounted on the Y-carriage 266.

During a cutting operation while the line follower 256 is tracking a line T, the output signals from the follower indicate the tangential direction or orientation of the traced line at each point, and the signals are transmitted through an electrical cable to a control computer 280. Within the computer, the output signals are used to develop machine command signals that are supplied to the drive motors 264 and 272 and cause the line follower to advance along the tracked line. Since the movements of the cutting blade 252 parallel the movements of the line follower, the cutting path P produced by the blade 252 in engagement with the material corresponds to the traced line. In other words, the cutting blade 52 is slaved to the line follower and generates cutting paths in the layup corresponding to the lines tracked in the marker drawing D.

Figure 17:
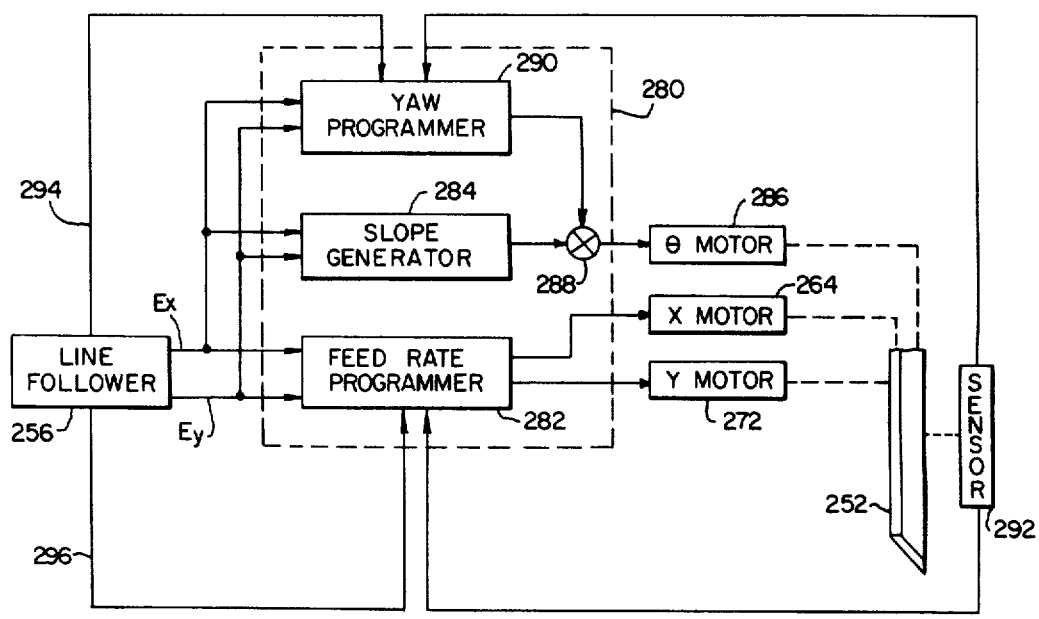
FIG. 17 is a schematic diagram illustrating the controls of the cutting machine in FIG. 15.

Fig. 17 illustrates schematically a control system by which the cutting blade and line follower cooperate in accordance with the present invention. The components within the control computer 280 are identified within the dotted line.

The line follower produces two analog voltage signals $E_x$ and $E_y$, which are processed through a feed rate programmer 282 to energize the X-drive motor 264 and the Y-drive motor 272. The drive motors in turn cause the line follower to move along the traced line and the cutting blade to generate a corresponding cutting path. The programmer 282 establishes the rate at which the motors are driven and the line follower and cutting blade advance.

The output voltage signals $E_x$ and $E_y$ are also supplied to a slope generator 284 which from the ratio of the voltages determines the angular orientation of traced line segment relative to the X- or Y-coordinate axis. The generator produces an orientation control signal that is applied to the $\theta$-drive motor 286 through a summing junction 288, and the drive motor orients the blade 252 accordingly. To this extent, the line follower controls are conventional and produce fundamental commands which cause the drive motors to translate the cutting blade tangentially along the cutting path.

To introduce yaw control in accordance with the invention, a yaw programmer 290 is provided within the control computer 280 and receives the voltage signals from which the angular orientation is determined for the traced line and cutting path. In addition, however, the programmer 290 may include one or more optional programs such as those described more particularly in connection with the embodiment of the invention and described in FIGS. 4a and 4b. For example, the programmer may include a prescheduled yaw program such as illustrated in FIG. 7. Additionally, or alternatively, a sensor 292 may be associated with the cutting blade to measure cutting parameters such as forces as described above in connection with FIGS. 9 and 10, and the programmer may include a yaw program such as illustrated in FIG. 11. From the programs, the programmer produces supplemental commands that are added to the fundamental commands at the summing junction 288. The cutting blade is then translated along the cutting path with fundamental commands as modified by the supplemental yaw commands.

When the line follower is an optical device that traces representations of the cutting path on the drawing D, the line follower can identify difficult cutting conditions within its field of view such as sharp curves, tangencies, points of close approach and closely spaced parallel lines. By producing an appropriate signal, as indicated at 294, the line follower can automatically call for selected yaw programs that accommodate the identified cutting condition. The yaw programmer 290 then generates supplemental commands which modify blade orientation.

In addition to the yaw programs, it is also possible to incorporate within the programmer 282 special feed rate programs which, for example, slow the cutting blade down at difficult or critical cutting conditions such as tangencies and points of close approach. Again, the line follower may provide signals as indicated at 296 which call upon the special feed rate programs within the programmer 282. Also, the feed rate programmer 282 may be connected as shown to receive signals from the blade sensor 292 and to modify feed rate in accordance with cutting parameters detected by the sensor.

In summary, the method and apparatus for cutting sheet material are provided by an automatically controlled cutting machine in which the computer includes an optional program memory and selector means by which various optional cutting programs may be selected and combined with a standard cutting program to produce an improved cutting operation. With the optional programs, the cutting machine is not limited by the standard cutting program but based on prior experience, testing and knowledge of the cutting technology that program or combination of programs which produces the most favorable results may be selected. A number of the optional programs define special methods of cutting sheet material which methods are themselves novel, and these methods contribute to improved cutting performance quite apart from the optional programming apparatus.

While the present invention has been described in preferred embodiments, it will be understood that numerous modifications and substitutions can be made without departing from the spirit of the invention. For example, although specific optional yaw programs have been identified and described, it should be readily apparent that numerous other optional programs may be used in combination with or in place of the described programs and the described programs can also be used in combination. The programs may be utilized to control blade yaw or other blade motions such as the feed rate of the blade along the cutting path and the stroking rate of a reciprocating blade. The selection of optional programs may be made once at the start of cutting an entire marker, or more frequently. Accordingly, the present invention has been described in a number of preferred embodiments by way of illustration rather than limitation.

I claim:

1. A method of cutting sheet material with an automatically controlled cutting machine having a cutting tool advanced along a cutting path during relative movements of the sheet material and cutting tool and in accordance with predetermined information defining the cutting path comprising:
   reducing the predetermined information to a machine readable form;
   establishing a primary program for processing the reduced predetermined information and generating fundamental commands for advancing the sheet material and the cutting tool relative to one another along the cutting path in accordance with the predetermined information;
   establishing an optional program for processing the reduced predetermined information in conjunction with the primary program and generating supplemental machine commands;
   storing the primary and optional programs in a program memory;
   activating the primary program stored in the memory;
   selectively activating or not activating the optional program stored in the memory by means of a selector on the cutting machine;
   processing the predetermined information with the primary program and generating fundamental machine commands when the optional program has not been selected at the cutting machine;
   processing the predetermined information with the primary and the optional program and generating supplemental and fundamental machine commands when the optional program has been selected at the cutting machine; and
   controlling the relative movement of the sheet material and the cutting tool with the machine commands generated.

2. A method of cutting sheet material with an automatically controlled cutting machine as defined in claim 1 wherein:
   the cutting tool is a cutting blade; and
   the establishing of an optional program comprises establishing a program which generates supplemental machine commands for maneuvering the cutting blade along the cutting path in cutting engagement with the sheet material.

3. A method of cutting sheet material with an automatically controlled cutting machine as defined in claim 2 wherein the optional program generates blade yaw signals for advancing the cutting blade along a cutting path in a position slightly out of alignment with the cutting path.

4. A method of cutting sheet material as defined in claim 3 wherein the optional program generates signals of predetermined value.

5. A method of cutting pattern pieces from sheet material as defined in claim 3 wherein the optional program generates yaw signals proportional to the curvature of the cutting path contours at each point.

6. A method of cutting pattern pieces from sheet material as defined in claim 3 wherein the optional program comprises a predetermined schedule of signals.

7. A method of cutting pattern pieces from sheet material as defined in claim 3 wherein the optional program defines an interrelationship of the yaw signals and a dynamically derived cutting parameter.

8. A method of cutting pattern pieces from sheet material as defined in claim 1 wherein additional steps comprise offsetting the cutting blade from the desired line of cut by a predetermined amount and guiding the cutting blade along an offset path in cutting engagement with the material.

9. An automatically controlled cutting machine for cutting sheet material comprising: a cutting table including a cutting tool and a support surface on which sheet material is held during a cutting operation; motive means responsive to machine command signals for moving the sheet material and cutting tool relative to one another in cutting engagement; computing means receiving data defining desired cutting paths in the sheet material for generating machine command signals which produce the desired cutting paths from the received data, said computing means also including an optional program memory having a program of biassing signals for combination with the machine command signals; and means for selecting the optional program.

10. An automatically controlled cutting machine as defined in claim 9 wherein the cutting tool is a cutting blade and the optional program memory contains a program of yawing signals for biassing cutting blade orientation along the desired cutting path.

11. A method of cutting pattern pieces from sheet material with an automatically controlled cutting machine having a cutting blade in accordance with marker data defining the pattern pieces comprising:
generating in a data processor from the marker data displacement signals for translating the cutting blade and the sheet material relative to one another along a cutting path;
calculating in the data processor from the marker data blade rotation signals for orienting the cutting blade to a position in alignment with the cutting path at each point along the path;
establishing an optional yaw program for adding yaw signals to said blade rotation signals in order to generate machine command signals which bias the cutting blade slightly out of alignment with the cutting path during the cutting operations;
storing the yaw program in a memory device associated with the data processor;
selectively activating the optional, stored yaw program in the memory device from a selector on the cutting machine to obtain yaw signals and combining the yaw signals with the calculated balde rotation signals to produce modified blade rotation signals; and
advancing the cutting blade and the sheet material relative to one another along the cutting path in cutting relationship in accordance with the displacement and modified blade rotation signals to cut the pattern pieces from the sheet material.

12. A method of cutting pattern pieces from sheet material as defined in claim 11 wherein the step of establishing an optional yaw program comprises establishing a fixed yaw program having a constant value.

13. A method of cutting pattern pieces as defined in claim 12 wherein the constant value of yaw is adjustable.

14. A method of cutting pattern pieces from sheet material as defined in claim 11 wherein the step of establishing an optional yaw program comprises establishing a yaw program proportional to the curvature of the cutting path at each point along the path.

15. A method of cutting pattern pieces from sheet material as defined in claim 14 further including the step of determining the direction of cutting about the pattern piece and the step of combining the yaw signals with the calculated blade rotation signals comprises combining the yaw and rotation signals algebraically to bias the cutting blade inwardly of the pattern piece periphery.

16. A method of cutting pattern pieces from sheet material as defined in claim 11 wherein the step of establishing an optional yaw program comprises establishing a yaw program to bias the cutting blade inwardly of each curved segment of the pattern piece periphery.

17. A method of cutting pattern pieces from sheet material as defined in claim 11 wherein the step of establishing an optional yaw program comprises establising a predefined schedule of yaw signals.

18. A method of cutting pattern pieces as defined in claim 17 wherein the schedule defines yaw as a function of cutting path direction.

19. A method of cutting pattern pieces from sheet material as defined in claim 17 wherein the schedule is a schedule of yaw dither.

20. A method of cutting pattern pieces as defined in claim 17 wherein the schedule is a function of a dynamically variable cutting parameter.

21. A method of cutting pattern pieces adaptively from sheet material as defined in claim 11 wherein the step of establishing an optional yaw program comprises establishing a yaw program which is a function of blade forces and; additional steps in the method include measuring blade forces during the step of advancing the cutting tool and developing feedback signals representing the measured forces; and wherein the step of activating the stored yaw program includes determining the yaw signals from the feedback signals.

22. A method of cutting pattern pieces as defined in claim 21 wherein the step of determining the yaw signals comprises calculating the yaw signals from the feedback signals in accordance with a predefined transfer function.

23. In an automatically controlled cutting machine having a cutting blade and a table on which sheet material is supported while the blade and sheet material are moved relative to one another in response to machine commands developed from data defining pattern pieces to be cut from the sheet material, the improvement comprising:
first computing means responsive to said data for generating displacement signals to control translation of the cutting blade and sheet material relative to one another along cutting paths corresponding to the shape of the pattern pieces;
second computing means also responsive to said data to determine blade rotation signals for orienting the blade along the cutting path in the direction of the path;

memory means for storing an optional yaw program defining yaw signals to be added by the second computing means to the blade rotation signals to rotate the cutting blade slightly away from the direction of the cutting path; and selector means operatively connected with the memory means for optionally engaging the memory means with the second computing means and introducing the yaw signals into the second computing means, the second computing means also being responsive to the introduced yaw signals and including means for combining the yaw signal with the blade rotation signals to produce modified blade rotation signals.

24. In an automatically controlled cutting machine, the improvement as defined in claim 23 wherein the memory means includes means for defining a fixed yaw program signal.

25. The improvement of claim 24 wherein the means defining a fixed yaw program signal comprises a manually adjustable means for adjusting the program signal.

26. In an automatically controlled cutting machine, the improvement as defined in claim 23 wherein the memory means includes means for defining a predefined schedule of yaw signals.

27. In an automatically controlled cutting machine, the improvement as defined in claim 23 wherein the memory means includes means for establishing yaw signals proportional to the curvature of the segments defining the pattern piece peripheries.

28. In an automatically controlled cutting machine, the improvement of claim 23 further including a transducer operatively associated with the cutting blade for measuring forces applied to the blade by the sheet material during the cutting operation; and wherein the memory means includes a stored yaw program relating forces with corresponding yaw signals.

29. In an automatically controlled cutting machine, the improvement as defined in claim 28 wherein the force transducer is an electrical transducer providing electrical feedback signals representing the forces to the memory means.

30. In an automatically controlled cutting machine having a cutting blade movable in cutting engagement with sheet material spread on a cutting table and including a line follower for tracking graphic representations of desired cutting paths to be produced in the material, the line follower being coupled with the cutting blade to slave the translated motions of the blade to the motions of the line follower, and also including computer means for deriving from the line follower additional information and generating fundamental machine commands for guiding the cutting blade tangentially along the desired cutting paths, the improvement comprising additional computing means for producing supplemental machine commands for given cutting conditions and means for cooperating with the computer to modify the fundamental machine commands with the supplemental machine commands under the given conditions and thereby improve cutting performance.

31. In an automatically controlled cutting machine, the improvement as defined in claim 30 wherein the additional computing means for producing supplemental machine commands comprises means for generating blade commands for orienting the cutting blade slightly out of the position tangent to the cutting path.

32. In an automatically controlled cutting machine the improvement of claim 30 wherein the additional computing means for producing supplemental commands includes a yaw programming means defining yaw angles for selected cutting conditions.

33. In an automatically controlled cutting machine, the improvement of claim 30, wherein the additional computing means for producing supplemental machine commands includes a feed rate programming means.

34. In an automatically controlled cutting machine, the improvement of claim 30 wherein sensing means are operatively associated with the cutting blade to detect a cutting parameter and produce corresponding parameter signals; and the additional computing means is connected with the sensing means and is responsive to the parameter signals to produce the supplemental commands.

35. In an automatically controlled cutting machine, the improvement of claim 34 wherein the sensing means is a load sensor and the additional computing means produces supplemental commands for reducing the sensed loads.

36. An automated cutting system comprising:

an automatic marker generating means for producing a marker of pattern pieces to be cut from sheet material, the generating means including a packing subroutine for arranging the pattern pieces in a closely packed array and identifying critical cutting locations such as points of tangency and close approach and closely spaced lines of cut associated with adjacent patterns;

a cutting machine having a cutting table for supporting sheet material in a spread condition, a cutting tool and motor means for moving the cutting tool and sheet material relative to one another in cutting engagement in response to machine commands;

computing means connected with the cutting machine and receiving from the marker generating means data defining the contours of closely packed pattern pieces in the marker and the critical cutting locations, and having a cutting program for generating fundamental machine commands for advancing the cutting tool in a controlled manner relative to the sheet material along lines of cut corresponding to the pattern contours, the computing means also including supplemental program means producing supplemental machine commands for biasing the fundamental machine commands and being responsive to the data from the automatic marker generating means identifying the critical cutting locations.

37. An automated cutting system as defined in claim 36 wherein the cutting tool in the cutting machine is a cutting blade having a leading cutting edge advanced through the cutting material.

38. An automated cutting system as defined in claim 37 wherein the supplemental program in the computing means is a yaw program producing machine commands for orienting the cutting blade slightly out of a position tangent to the cutting path.

39. An automatically controlled cutting machine as defined in claim 9 wherein the computing means receiving the data defining the desired cutting paths also analyzes the data for critical cutting conditions and operates the selecting means to select an optional program for the critical condition.

* * * * *